United States Patent
North, Jr.

(10) Patent No.: US 7,325,026 B1
(45) Date of Patent: Jan. 29, 2008

(54) NETWORK COMMUNICATIONS ANALYSIS

(75) Inventor: Paul R. North, Jr., South Lyon, MI (US)

(73) Assignee: Compuware Corporation, Farmington Hills, MI (US)

( * ) Notice: Subject to any disclaimer, the term of this patent is extended or adjusted under 35 U.S.C. 154(b) by 602 days.

(21) Appl. No.: 10/011,347

(22) Filed: Nov. 12, 2001

(51) Int. Cl.
G06F 15/16 (2006.01)

(52) U.S. Cl. ...................... 709/201; 709/208

(58) Field of Classification Search ........ 709/200–211, 709/217–238; 379/29.06; 713/201; 719/313, 719/318, 319
See application file for complete search history.

(56) References Cited

U.S. PATENT DOCUMENTS

| | | | |
|---|---|---|---|
| 5,802,304 A * | 9/1998 | Stone | 709/227 |
| 5,878,420 A | 3/1999 | de la Salle | 707/10 |
| 5,983,259 A | 11/1999 | Campbell et al. | 709/200 |
| 5,987,611 A * | 11/1999 | Freund | 713/201 |
| 6,006,263 A * | 12/1999 | Horwitz | 709/225 |
| 6,144,961 A * | 11/2000 | de la Salle | 707/10 |
| 6,182,146 B1 * | 1/2001 | Graham-Cumming, Jr. | 709/238 |
| 6,249,821 B1 * | 6/2001 | Agatone et al. | 719/316 |
| 6,311,278 B1 * | 10/2001 | Raanan et al. | 713/201 |
| 6,421,738 B1 * | 7/2002 | Ratan et al. | 719/328 |
| 6,529,943 B1 * | 3/2003 | Ohi | 709/206 |
| 6,728,771 B2 * | 4/2004 | Stumer | 709/227 |
| 6,859,835 B1 * | 2/2005 | Hipp | 709/227 |
| 6,944,106 B2 * | 9/2005 | Suzuki | 369/47.53 |
| 6,961,765 B2 * | 11/2005 | Terry | 709/224 |
| 2002/0026505 A1 * | 2/2002 | Terry | 709/221 |
| 2002/0083217 A1 * | 6/2002 | Ward et al. | 709/328 |
| 2003/0005281 A1 * | 1/2003 | Cihula | 713/151 |

* cited by examiner

*Primary Examiner*—Saleh Najjar
*Assistant Examiner*—Asad M Nawaz
(74) *Attorney, Agent, or Firm*—Fenwick & West LLP

(57) ABSTRACT

Network protocol communications used by an application are captured and analyzed. Routines corresponding to particular calls that an application invokes in implementing a targeted network communication protocol are hooked. A stub is called, which retains a current state of the application in a memory location that will not be compromised, and calls second stage code that makes the call on behalf of the application. Information corresponding to the performance of the call is captured and may be variously analyzed. Upon a completion of call, control is returned to the stub, which restores and adjusts the application state to reflect the actual performance of the particular call. The stub can also restore the application and allow the call to proceed transparently to the application, should the monitoring process be terminated prior to completion of the call. In one embodiment, TCP/IP protocol communications are monitored by hooking socket calls made by an application.

55 Claims, 7 Drawing Sheets

NETWORK COMMUNICATIONS ANALYSIS

BACKGROUND OF THE INVENTION

1. Field of the Invention

This invention relates generally to analyzing computer networks, and more particularly to analyzing network communications of applications by capturing and recording their communications that use targeted protocols.

2. Description of the Related Art

As networked computers proliferate, there is a corresponding need to evaluate the network communications of applications operating within the network. To be effective, a network communications analyzing system should be able to test applications, and identify and isolate any problems in running the applications under the various actual network conditions that an application may encounter.

One problem in analyzing network communications is that an operating system with which an application operates may not directly facilitate capturing desired communications. For example, an operating system may not allow direct and coherent access to Transmission Control Protocol/Internet Protocol (TCP/IP) communications implemented by an application.

Additionally, the perspective of the application is desirable in certain performance evaluations. That is, analyzed information should appear as though it had been directly captured by the application to provide a highly effective monitoring tool. Merely looking at a class of network communications by collecting packets and assembling them after the fact would not be efficient, and would not offer the desired perspective for much of the criteria that one would like to consider in evaluating network performance. Compounding this problem is the desire for transparency in network analysis. That is, monitoring should be transparent to the application, as the application may be monitored after it has been introduced to its intended users, and any disruption of the functionality of the application would be viewed quite negatively.

Thus, there remains a need for network communications monitoring that can effectively access and analyze performance despite some of the obstacles presented by operating systems and applications implementing the network communications, and for monitoring that remains transparent to the application invoking the network communications protocol, while still retaining the perspective of the application.

SUMMARY OF THE INVENTION

The described embodiments of the present invention allow network protocol communications implemented by an application to be effectively captured and analyzed. Although at least some embodiments of the invention are described in connection with a particular operating system, and particular network protocols, the invention is not necessarily limited to such environments.

In one aspect, described embodiments of the invention hook routines corresponding to particular calls that an application invokes in implementing a given network communication protocol. One embodiment of the invention modifies the entry points of the routines in order to establish these hooks. When one of these particular calls has been hooked the current state of the application is retained in a memory location that will not be compromised even after any hooks are removed. After the current state of the application is secured, the call is made on behalf of the application and a set of information corresponding to the performance of the call is obtained.

Upon a completion of call, control is returned and the application is updated to reflect the actual performance of the call. The call is also completed notwithstanding any termination of communication monitoring, retaining the transparency of the monitoring system to the application.

One embodiment monitors TCP/IP communications. More particularly, socket interface routines corresponding to various socket calls made by an application are hooked, and the performance of these socket calls is captured and recorded for analysis. Examples of collected information include data that is sent or received pursuant to the socket call, and connections that are being terminated or established pursuant to the socket call. Additionally, statistical information such as connection counts, data volumes, and timings can be collected and analyzed.

Other embodiments of the present invention facilitate the effective analysis of network communications that implement encryption protocols. These types of communications are preferably captured before they are encrypted for transmission, and after they are decrypted upon receipt, so as to allow coherent and effective analysis of the captured information.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
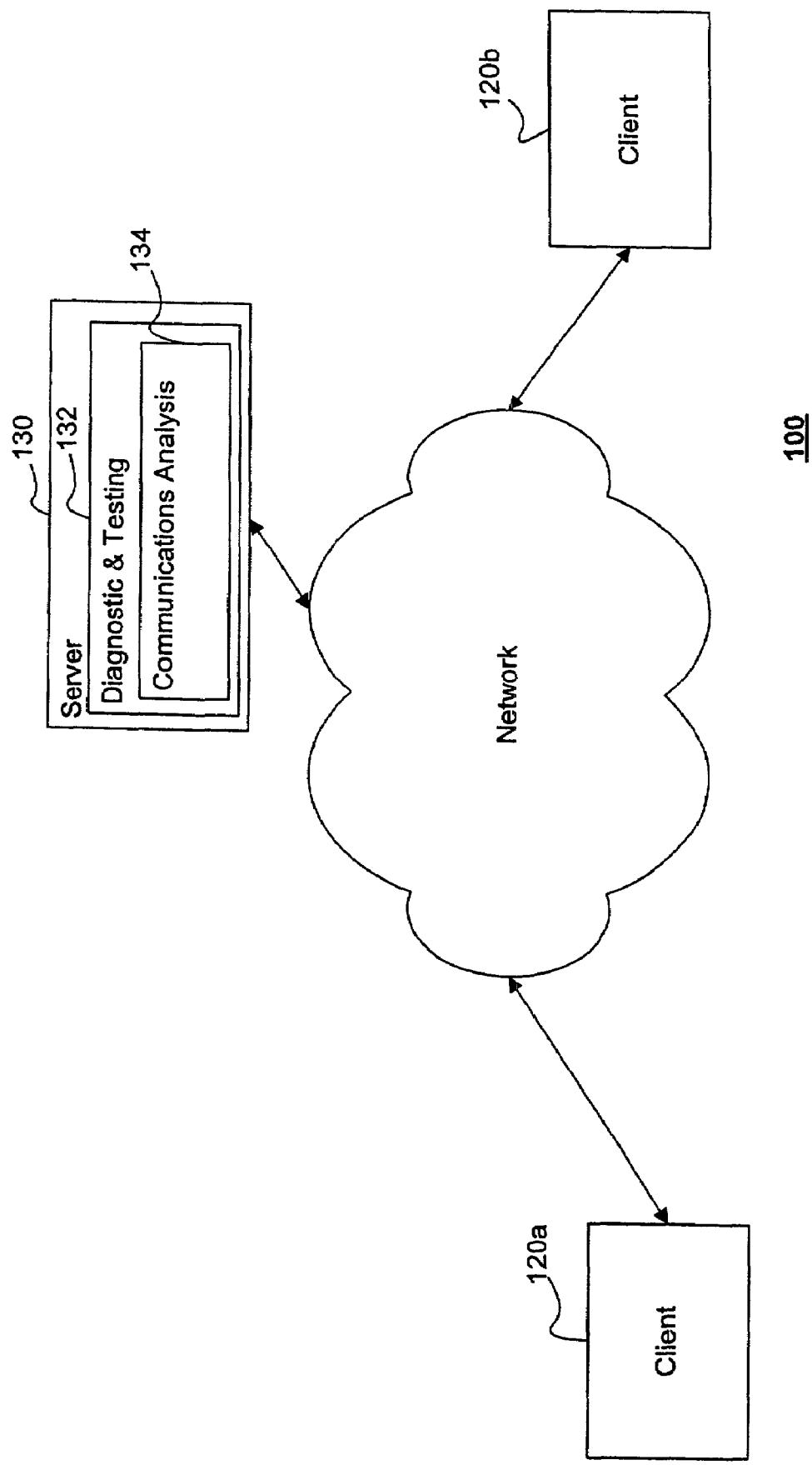
FIG. 1 is a schematic diagram illustrating an example of a system including an embodiment of the present invention.

The schematic diagram of FIG. 1 illustrates a system 100 including an embodiment of the present invention. Particularly, various clients 120*a*, 120*b* communicate with a server 130 through a network using various conventional protocols that will be readily recognized by the ordinarily skilled artisan. Although embodiments of the present invention are not so limited, one example is TCP/IP, which allows communication between network nodes according to a traditional "client-server" communications model. Additionally, particularly where additional security is desired, protocols such as Secure Sockets Layer (SSL) may be used in conjunction with TCP/IP to provide encrypted communications over the network.

A diagnostic and testing module 132 resides within the server 130. The diagnostic and testing module 132 generally originates, executes, and records the results of tests that are used to evaluate the performance of the system. QAHiperstation as provided by Compuware Corporation headquartered in Detroit, Mich. is an example of a diagnostic and testing module 132.

The diagnostic and testing module 132 is preferably further configured to include a communications analysis module 134, which captures and records targeted network communications in accordance with the present invention. Preferably, this is accomplished by hooking a call that is made by the application and that corresponds to an implementation of the network communication protocol, retaining a current state of the application for the hooked call, making the call on behalf of the application, and obtaining a set information pertaining to the performance of the call.

Figure 2:
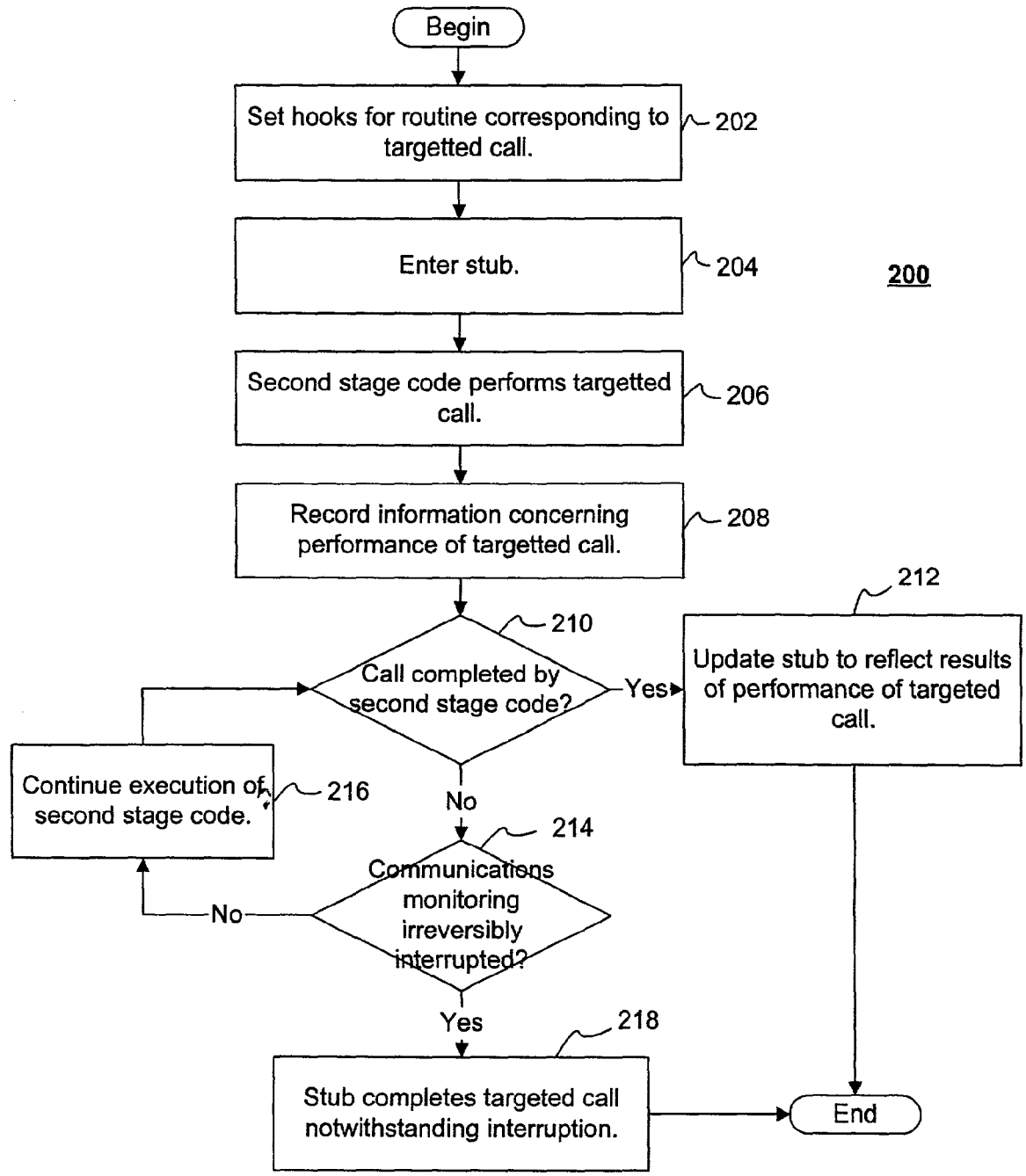
FIG. 2 is a flow diagram illustrating an embodiment of analyzing network communication protocols in accordance with the present invention.

The functionality of the communications analysis module 134 is further described with reference to the flow diagram of FIG. 2. Routines corresponding to a targeted call are preferably hooked. For example, a routine for a socket call is hooked where TCP/IP communications are analyzed. The hooks are made by modifying routine entry points to pass through code that "hooks" the routine and initiates the communications analysis functionality. When the communications analysis module 134 is started, the various hooks are set (202). When an application utilizes one of the hooked routines, a stub is entered (204). The stub retains a current state of the application. The current state is preferably stored in a memory space that will prevent it from being inadvertently compromised during the execution of subsequent operations.

Second stage code then performs (206) the targeted call on behalf of the application. The second stage code retains control of the function call parameters, and can assess the performance of the targeted call as though it was taken from the perspective of the application. Information regarding the performance of the targeted call is then recorded (208). Although any type of information may be recorded, some examples include data that is being sent or received, connections that are being established or terminated, and the IP addresses of the parties in the communication. Additionally, statistical information such as connection counts, data volumes and timings may be collected.

Upon a determination (210) that the second stage code has completed the targeted call on behalf of the application, the stub is updated (212) to reflect the completion of the function call. Control is returned to the stub along with information to provide an updated state of the application, reflecting the completion of the call. For example, this information includes data, data length, a target IP address, and return codes for particular calls.

If it is not yet determined (210) that the second stage code has completed the targeted call, but it is determined (214) that communications monitoring has been irreversibly interrupted, then the stub completes (218) the targeted call notwithstanding the interruption. This allows the call to be completed by the stub, by making the targeted call on behalf of the application, using the "current state" of the application that had been stored prior to handing control over to the second stage code, which allows communications analysis that is transparent to the application.

If it has not yet been determined (214) that the second stage code has been irreversibly interrupted, then the execution of the second stage code continues (216) until there is such an interrupt as described above, or the targeted call is determined (210) to have been completed by the second stage code, whereupon the stub is updated (212) to reflect the results of the call, also as described above.

Figure 3:
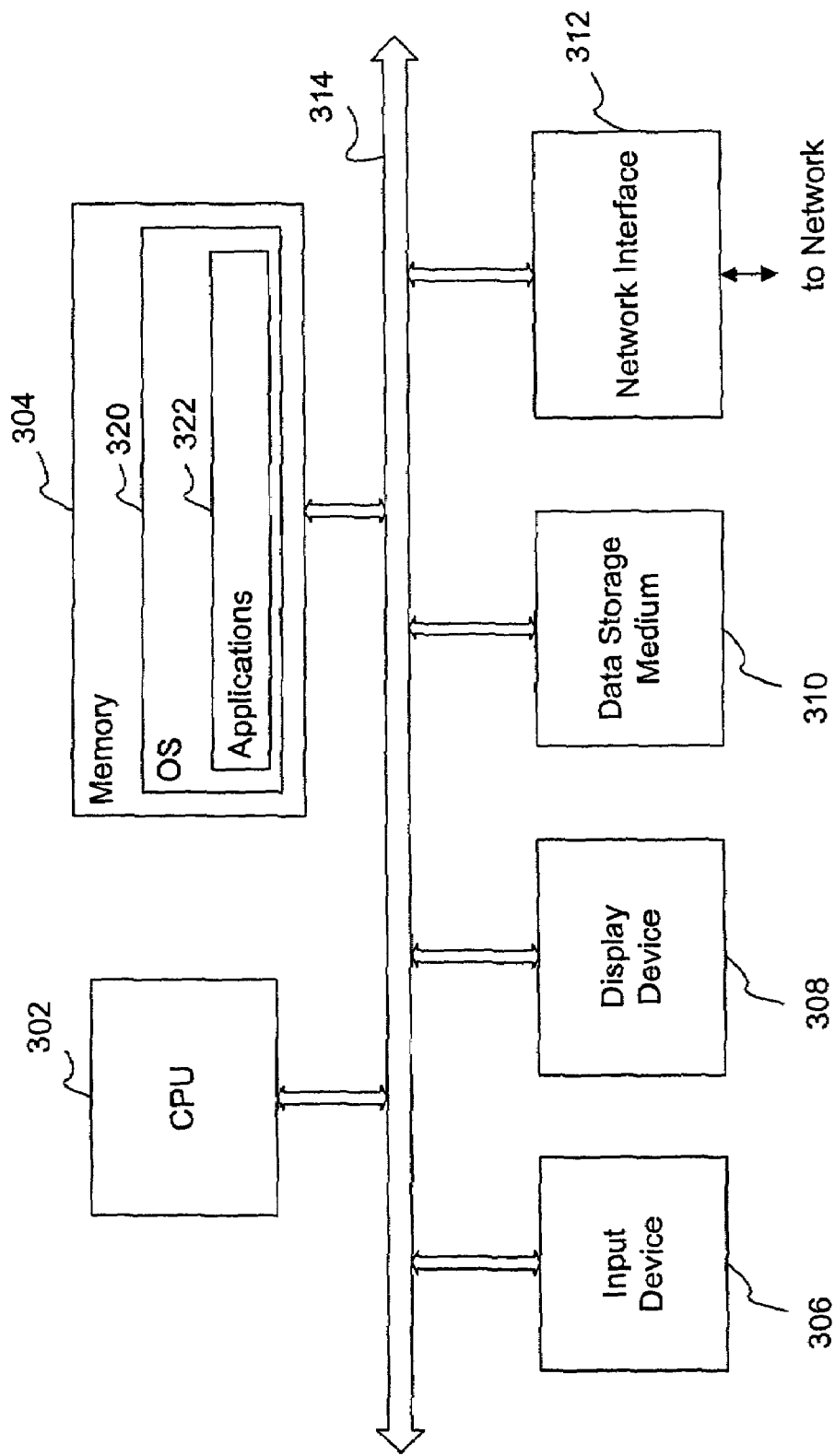
FIG. 3 is a block diagram illustrating the client system of FIG. 1 in more detail.

The block diagram of FIG. 3 illustrates a client system 300 in more detail. Particularly, the client system 300 includes a CPU 302, memory 304, input device 306, display device 308, data storage medium 310, and network interface 312, interconnected by a bus architecture 314 in conventional fashion.

The CPU 302 executes instructions such as those provided in memory 304 to provide various functionalities, often in conjunction with other elements of the system. A data storage medium 310 provides non-volatile data storage, and is preferably a magnetic or magneto-optic hard disk device. The input device 306 and display device 308 are conventional, and respectively provide conventional interfaces for the user, such as through visual displays and manual (e.g., key and/or mouse) input. The network interface 312 is a conventional interface for providing network connectivity.

The client system 300 can include different items than those noted in the described embodiment. Items such as I/O ports for interfacing with printers and plotters, a floppy disk drive, a CD ROM drive, and others can be included, and items such as the hard disk can be excluded. The ordinarily skilled artisan will recognize the various alternatives for the client system 300.

Still referring to FIG. 3, the memory further includes an operating system 320 and applications 322. The operating system 320 is a program that is typically loaded into memory 304 during a boot up sequence. The operating system 320 manages the other programs in the client system 300, which are referred to as applications, and includes particular instructions and operations that can be used by the applications, either directly or through an application program interface. The operating system 320 also handles exchanges to and from devices connected to the system (e.g., printers, disk drives, etc.), manages memory use, and allocates computing resources in multitasking environments. In one embodiment, the client system 300 operating system 320 is an OS/390 operating system as provided by International Business Machines Corporation in Armonk, N.Y. (IBM).

As previously indicated, TCP/IP protocols may be implemented for network communication. These protocols are also typically one of the elements that collectively provide point-to-point communications according to the Open Systems Interconnection (OSI) reference model, which includes various layers of functionality that need not be described in detail herein. Among these layers is the applications layer, which is the highest layer, at which communication partners are identified and other operations are undertaken.

Generally attempting to capture all TCP/IP communications for a node is not practical, as the captured data would not be coherent. These communications are preferably captured by hooking relevant routines at the application program interface. The relevant routines are those that correspond to the application's implementing the targeted communication protocol. This maximizes on the value of the recorded information because the collected information corresponds to requests made by the application, rather than all instances of the communications protocol by the client system. The routines that are hooked in OS/390 embodiments are preferably individual sockets interfaces in the Unix Systems Services address space. The hooking of these routines is described further with reference to the functional description of the operation of an embodiment of the invention, in connection with FIG. 6, below.

Figure 4:
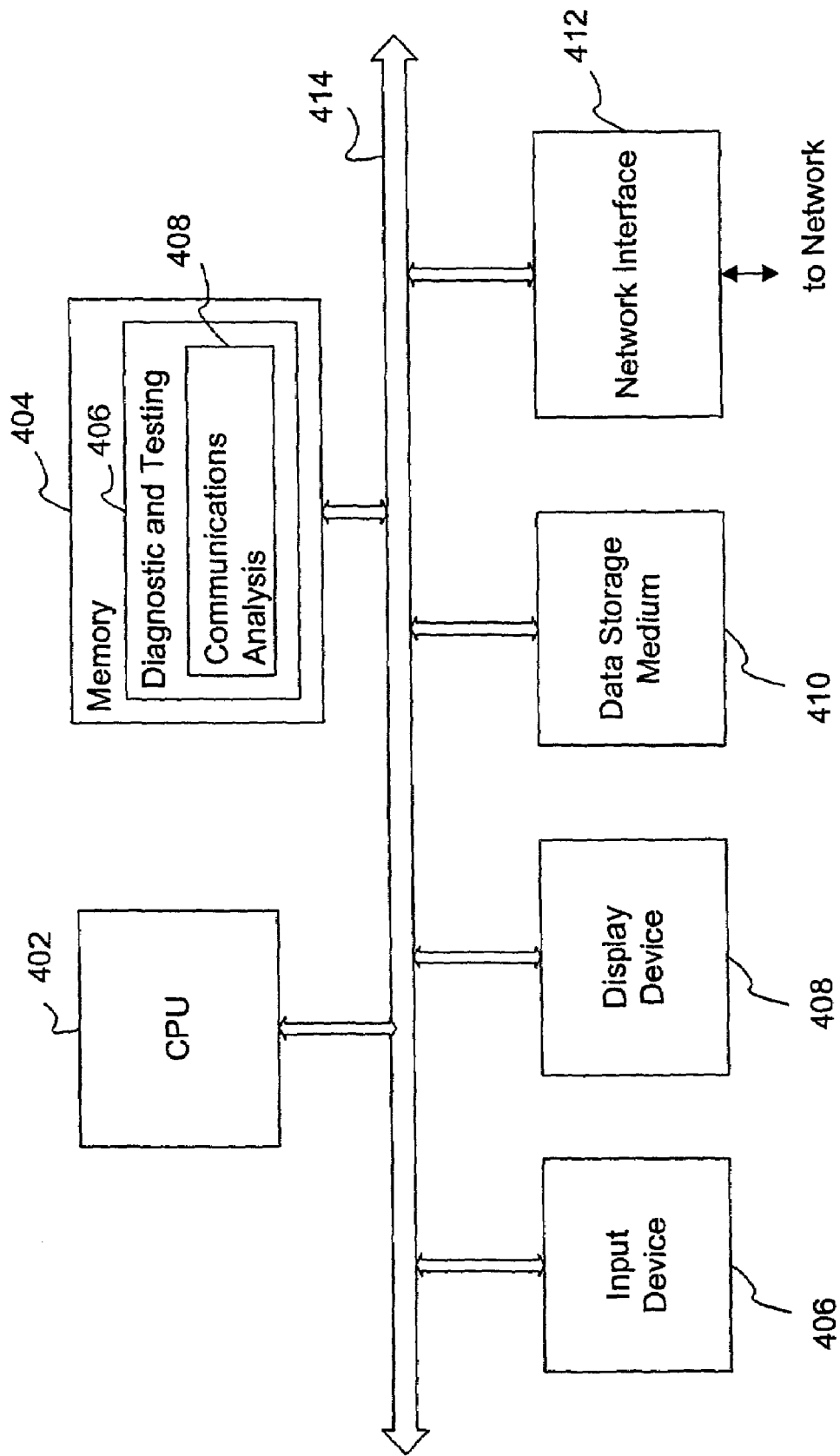
FIG. 4 is a block diagram illustrating a server system including an embodiment of analyzing network protocol communications in accordance with the present invention.

The block diagram of FIG. 4 illustrates an embodiment of a server system 400 for analyzing network protocol communications in accordance with the present invention. The sever system 400 includes a CPU 402, memory 404, input device 406, display device 408, data storage medium 410 and network interface 412, all conventional components interconnected in conventional fashion by a system bus 414. Generally, these are conventional components analogous to those described in connection with the client system of FIG. 3. Additionally, as with the client system, the server system 400 preferably includes an operating system (not shown) and resources that facilitate the general conventional server functionality, including network communications implementing protocols such as TCP/IP and SSL. A preferred embodiment of the server system implements the IBM OS/390 operating system. In this scenario, the server system 400 is often referred to as a mainframe system, which handles various requests from client systems, which are also referred to as workstations.

The memory further includes a diagnostic and testing module 406 and a communications analysis module 408. The diagnostic and testing module 406 includes conventional software and originates, executes, and records the results of tests that are used to evaluate the performance of elements of the network as described above regarding the analogous module of FIG. 1. The communications analysis module 508 captures and records targeted network communications in accordance with the present invention. The communications analysis module 408 preferably hooks calls made by applications operating at client system nodes on the network, retains a current state of the application for the hooked call, makes the call on behalf of the application, and obtains a set information pertaining to the performance of the call.

Figure 5:
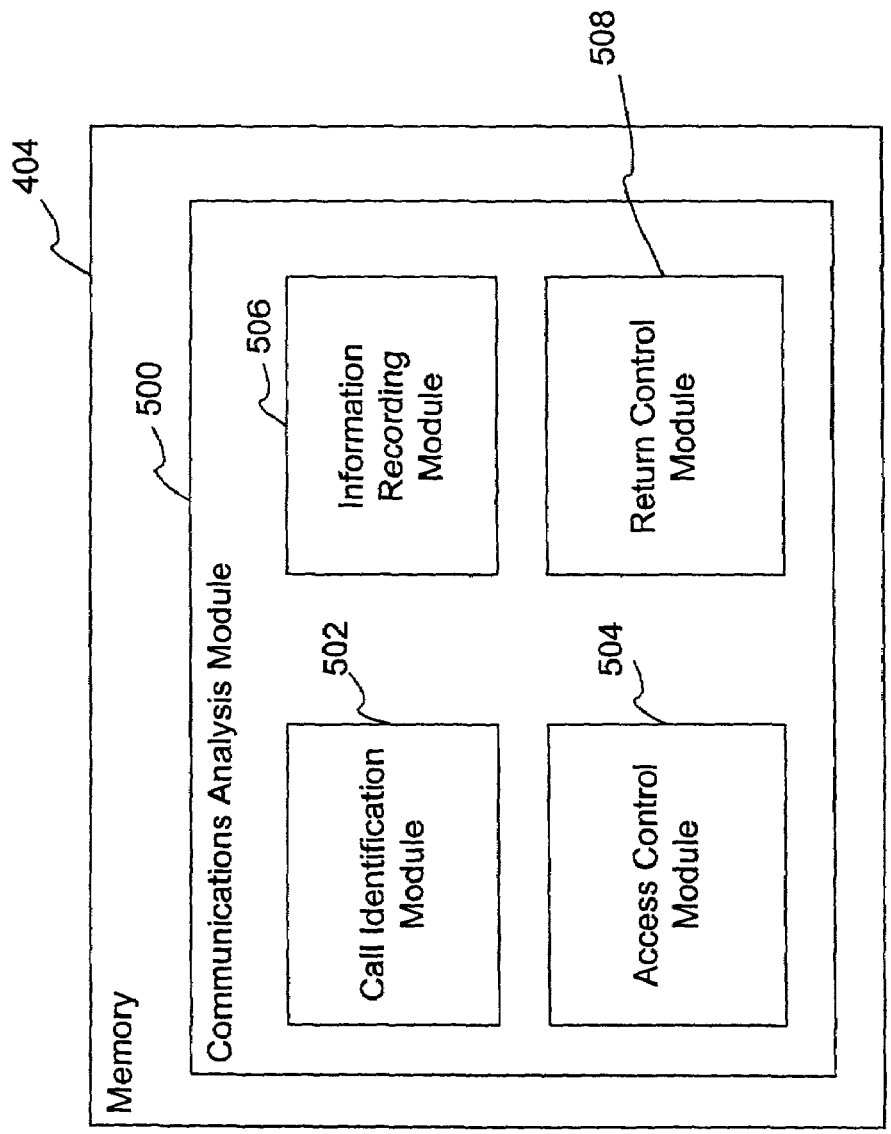
FIG. 5 is a block diagram illustrating an embodiment of a communications analysis module in accordance with the present invention.

Referring to FIG. 5, an embodiment of a communications analysis module 500 in accordance with the present invention resides within the server system memory 404 and includes routines that provide functionality described above in connection with FIG. 2 and the functionality to be described in connection with the flow diagram of FIG. 6, below.

An embodiment of the communications analysis module 500 is modularized as indicated in FIG. 5, namely to include a call identification module 502, an access control module 504, an information recording module 506, and a return control module 508.

When an application operating at a client system invokes a routine corresponding to a targeted call, that routine is hooked so that the communications analysis module 500 can establish access to, and control over, the targeted call. The call identification module 502 hooks a targeted call and enters a stub corresponding to the targeted call. The access control module 504 makes the targeted call on behalf of the application. Routines provided by the information recording module 506 initiate recording of information related to the performance of the targeted call. Finally, the return control module 508 contains information, such as a "current state" of the application that is saved upon hooking the targeted call, or other parameters required for an effective and transparent return of control to the application.

The communications analysis module 500 is preferably provided in the form of software, but may also be provided as hardware, firmware, or any combination of the three. Additionally, although a modular breakdown of the functionality of this embodiment of the invention is described, it is not limited to the described modular breakdown. That is, fewer or more modules may perform functions similar to those described regarding the four illustrated modules. Furthermore, network communications analysis functionality may reside at nodes other than that corresponding to a mainframe, or server system, and "client" requests including those originating within the server system may be monitored.

Figure 6:
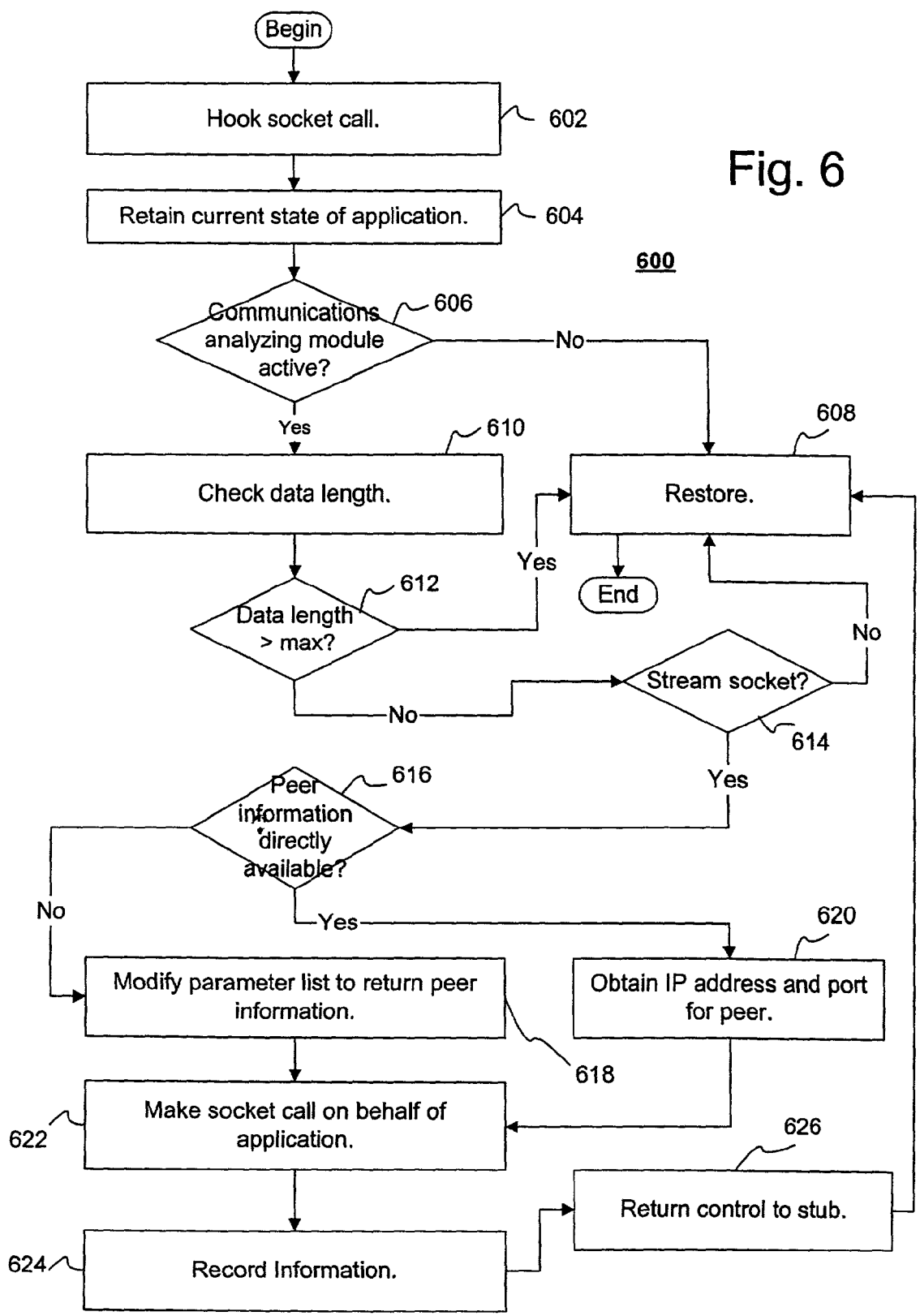
FIG. 6 is a flow diagram illustrating another embodiment of analyzing network communication protocols in accordance with the present invention.

The flow diagram of FIG. 6 further describes operation of the communications analysis module 500. Although the present invention is not necessarily so limited, this embodiment is described in connection with the monitoring of TCP/IP network communications made by a client system to a server system implementing the OS/390 operating system.

Initially, a socket call routine by an application is hooked (602). There are no direct TCP/IP hooks in the OS/390 system. This embodiment overcomes this obstacle by hooking routines corresponding to socket calls that are used in TCP/IP protocol communications. Examples of socket calls implemented by the OS/390 system include: Socket Accept; Socket Close; Socket Connect; Socket Read/Write; Socket Send/Receive; and Socket Shutdown. The entry points of routines corresponding to these calls are modified to pass through code that provides the communications analysis functionality described below. Desired routines are hooked by examining control information used by the operating system. Routines used by the OS/390 Physical File System (PFS) for the above socket calls are preferably hooked. For Socket Connect, an OS/390 PFS routine that performs the socket connecting function is hooked. The ordinarily skilled artisan, once instructed according to the present invention, will recognize other routines to be hooked for various types of calls.

A stub is preferably entered for a hooked call. The stub generally saves the current state of the application, performs the call on behalf of the application, and restores the state of the application upon a completion of the call. The stub is preferably stored in a memory space that will prevent it from being inadvertently compromised during the execution of subsequent operations. In certain environments, this memory is referred to as permanent memory called common storage. Although a stub is preferred, any code for carrying out the communications analysis functionality may be provided.

The stub retains (604) a current state of the application for a hooked call. The current state comprises everything that might be modified during the performance of the call. When the results of the call are reported back to the application, it will look exactly as though the call was performed by the application. For the OS/390 environment, the contents of the general and access registers are saved, in addition to parameters related to the call made by the application.

If it is determined (606) that the communications analysis module 500 is no longer active prior to the completion of a call made by the module 500 on behalf of the application, the stub completes the call on behalf of the application notwithstanding the termination, and restores (608) the state of the application to reflect the completion of the call. Particularly, where the communications analysis module 500 is terminated, control is retained by the stub, which implements the registers and parameters related to the socket call, makes the socket call, and restores the state of the application.

Accordingly, the operation of the communications analysis module 500 remains transparent to the application even if it is terminated in the midst of analyzing the performance of a call. Note that although the flow diagram illustrates the step of determining whether the communications analysis module is active at a certain processing stage, the step may effectively be made at any point in the flow, prior to the completion of the call on behalf of the application.

If the communications analysis module 500 remains activated, then the processing of the call on behalf of the application continues. Certain calls, such as a SEND, may have a corresponding data length of appreciable size. Accordingly, the data length to be implemented in the call may be checked to ensure that it does not exceed a maximum. The maximum data length may be an explicit amount set by the user, or it may be dynamically determined based upon an examination of the available buffer space. The data length is checked (610) and if it is determined (612) that it exceeds the maximum, the call is not monitored but it is nonetheless completed according to the above described restore (608) procedure.

If it is determined (612) that the maximum is not exceeded, processing of the socket call continues where the socket type may be examined to determine whether it is a stream socket. Although they may be monitored, in some applications non-stream sockets are not desired because of their connectionless functionality. Calling a conventional routine that returns socket information identifies the socket as a stream socket. If it is determined (614) that it is not a stream socket, then the call is not monitored, but the above described restore (608) procedure is again invoked.

Although screening of calls to handle only stream sockets is shown, various different modes of screening calls may be provided. The ordinarily skilled artisan will readily recognize the alternatives for screening calls, and there may be more or less screening steps than are indicated in FIG. 6. For example, where multiple instances of TCP/IP could be present on the network, it might be desirable to limit those being monitored. There, the TCP/IP instance can be checked to determine whether it is specified in the TCP/IP( ) parameter at start up, with appropriate instances being monitored.

If it is determined (614) that it is a stream socket, then the socket call remains a candidate for monitoring, and processing continues. The socket call is then examined to determine (616) whether peer information (e.g., the IP address and port) is directly available. This may also be accomplished by examining the type of socket call. For calls such as Socket Accept the caller's IP address and port are for the listening port, so the call does not really have a peer. Where it is determined (616) that the peer information is not directly available from the socket call, the parameter list is modified (618) to return the peer information. Particularly, the caller's parameter list is modified to return the peer name with the connection. The parameter list is restored after the call has been handled to retain transparency. For other calls the peer information is obtainable directly and is therefore obtained (620) without having to modify the parameter list.

The socket call is then made (622) on behalf of the application. Since the call has been hooked and accessed by the communications analysis module in the above-described fashion, the module has the opportunity to record various information about the performance of the call. Typically the call is made in conventional fashion, and the desired information is retrieved after the fact.

As indicated previously, this information includes but is not limited to data that is being sent or received, connections that are being established or terminated, and the IP addresses of the parties in the communication. Additionally, statistical information such as connection counts, data volumes and timings is also collectable. Various conventional techniques are used to retain data. The communications analysis module accesses buffers for data and writes data to be retained to hard disk or the like where desired.

When the call made on behalf of the application is completed, control is returned (626) to the stub, so that the application may be updated to reflect the completion of the call. The routines are generally exited as though they had been completed in conventional fashion. For example, for a read operation, data is read into a buffer and upon completion of the read operation the data remains and conventional parameters confirming the read are provided to the application.

The above described procedure implements the sequence of hooking the routine corresponding to the socket call, making the call on behalf of the application, and then returning control. The ordinarily skilled artisan will recognize various processing sequences as dictated by the types of monitored operations. For example, for a Socket Close operation, it is desirable to monitor information while the socket remains open, so the information will be examined prior to the completion of the call. For a read or write operation, it is desirable to examine the information after the call is completed (i.e., after the data has been read into a buffer).

Figure 7:
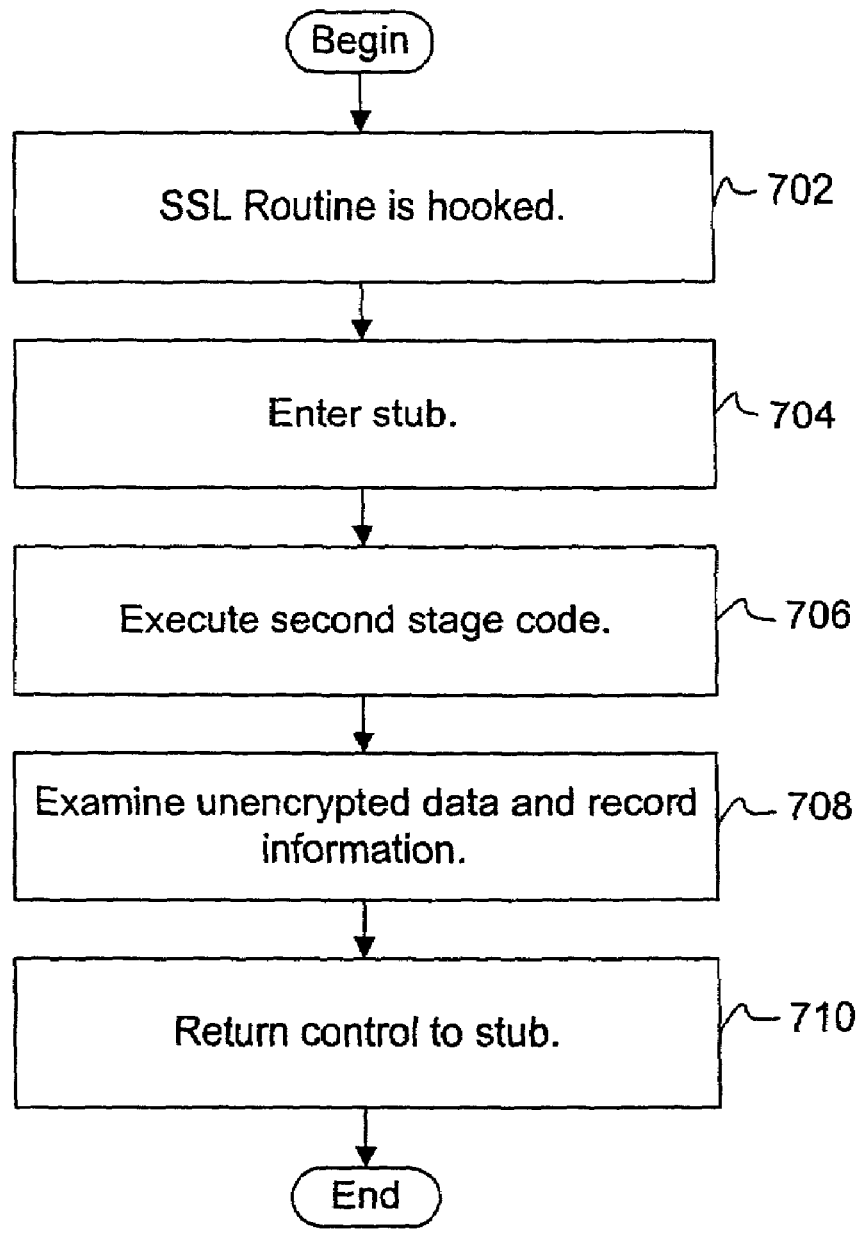
FIG. 7 is a flow diagram illustrating an embodiment of analyzing network communications that implements encryption protocols in accordance with the present invention.

In accordance with another aspect, embodiments of the present invention may monitor and record communications that implement encryption protocols. The flow diagram of FIG. 7 illustrates an embodiment of analyzing SSL type network communications in accordance with the present invention.

In order to record SSL (Secure Sockets Layer) data in a way that is meaningful to application programmers it is useful to examine the transmitted data in an unencrypted state. Due to the dual key encryption techniques in use today the recording of encrypted data would be meaningless and unusable for many purposes. The hooking technique described here demonstrates a method for recording outbound SSL data before it has been encrypted and inbound SSL data after it has been decrypted, so that coherent data may be captured and analyzed.

Initially, an SSL routine is hooked 702. An application program that uses SSL uses specific routines for sending and receiving the data. The encryption/decryption is done transparently to the application. For example, the standard IBM routines for doing this are located in either the application program's address space or in the Link Pack Area (LPA). The hooking of these routines is accomplished by scanning for their fingerprint (e.g., identifiable bit pattern) in a module used by the operating system.

As with the above described embodiments pertaining generally to network communications and TCP/IP communications, the actual operation of the hooks occurs in two stages. As indicated in step 704, at the first stage a "stub" is entered. Similarly, this stub is loaded into permanent memory when the hooks are initialized and remains in storage even after the hooks have been removed. Again, this allows the transparent operation of application programs if the software is shut down while SSL operations are "in flight." The stub saves the current state of the application and then calls (706) the second stage code.

The second stage code is now able to safely examine (708) the unencrypted data that is being sent or received by the application. In the mainframe environment this step is accomplished at the mainframe as the data is available in unencrypted form prior to its entering the secure socket. Information that may be collected includes, but is not limited to, data that is being sent or received and the IP addresses of the partners in the communication. In addition, it is possible to collect statistical information such as data volumes and timings.

After its work has been completed, the second stage code returns (710) to the stub where the application state is restored and adjusted to reflect the actual SSL call that was made. All of this is completely transparent to the application and to the operating system.

Still another embodiment of the present invention may analyze IBM MQSeries communications. The hooking technique described here accomplishes this by hooking the MQSeries program request handler program located in the ECSA (Extended Common Storage Area). Both system and application calls to the MQSeries system pass through this program. The individual call types (i.e. GET, PUT, OPEN, CLOSE) are distinguished by examining the parameters being passed by the application or system routine and by examining the contents of unpublished control information. Once hooked, the routines are handled in a fashion similar to that described for TCP/IP socket calls above.

Thus, network communications are analyzed in accordance with the present invention. Although the present invention has been described in considerable detail with reference to certain embodiments thereof, other embodiments are possible. For example, although a particular modularization of certain hardware and software is illustrated and described, corresponding functionality may easily be provided under a different modularization. Additionally, although monitoring a particular network communication protocol implemented by a particular operating system is described, other protocols used by other operating systems can also be monitored and analyzed using the same principles. Therefore, the sprit and scope of the appended claims should not be limited to the description of the embodiments contained herein.

The invention claimed is:

1. A method for analyzing communications made by a mainframe application operating at a node on a computer network, the method comprising:
   identifying, responsive to a communications analysis module beginning execution, a plurality of routines corresponding to socket calls within the application to select locations to hook the application in response to the application lacking predetermined locations to hook;
   hooking the application at the selected locations by modifying routine entry points so as to additionally execute communications analysis code;
   receiving a user request, the user request comprising an Internet Protocol (IP) port number and an IP address of a client system or a server system;
   responsive to the received user request corresponding to a hooked location, executing the corresponding communications analysis code, the actions of the code comprising:
      retaining a current set of state data of the application, wherein the state data if not retained would otherwise be modified by the communications analysis code;
      making a communications call on behalf of the application, the communications call transparent to the application; and
      storing in a file a set of information communicated in response to making the communications call.

2. The method of claim 1, wherein hooking the application comprises executing an alternate routine in place of a routine that is normally executed when the communications call is made by the application.

3. The method of claim 1, further comprising:
   after making the communications call on behalf of the application, determining a completion of the communications call; and
   returning information to provide a revised state of the application that reflects the completion of the communications call.

4. The method of claim 1, further comprising:
   determining a termination of communications monitoring prior to a completion of the communications call; and
   providing a revised state of the application notwithstanding the termination of communications monitoring.

5. The method of claim 1, wherein the communications call is a TCP/IP socket call.

6. The method of claim 2, wherein the communications call is a TCP/IP socket call.

7. The method of claim 6, wherein the set of information includes at least one of (a) data sent by the application and (b) data received by the application with the TCP/IP socket call.

8. The method of claim 6, wherein the set of information includes an IP address for a partner in a communication corresponding to the TCP/IP socket call.

9. The method of claim 5, wherein the communications call on behalf of the application is made responsive to a data length corresponding to the socket call being under a maximum data length.

10. The method of claim 5, further comprising:
    modifying a parameter list of the socket call to return peer information prior to hooking the application; and
    restoring the parameter list after hooking the application.

11. The method of claim 1, wherein the communications call is a secure sockets call.

12. The method of claim 11, wherein the set of information includes data sent through a secure socket, and the data is in unencrypted form.

13. The method of claim 12, wherein the set of information includes data received through a secure socket, and the data is in unencrypted form.

14. The method of claim 1, wherein a stub retains the current state, determines a termination of communications monitoring prior to a completion of the call, and provides a revised state of the application notwithstanding the termination of communications monitoring.

15. The method of claim 1, wherein the socket call for a TCP/IP communications protocol as implemented by an operating system of the client system or of the server system and the communications call is another socket call.

16. The method of claim 1, wherein the communications are message queuing application communications and a program request handler program located in an Extended Common Storage Area (ECSA) is hooked.

17. A computer readable storage medium that stores a set of software instructions, which are executable to analyze communications made by a mainframe application operating at a node on a computer network, the instructions comprising:
    identifying, responsive to a communications analysis module beginning execution, a plurality of routines corresponding to socket calls within the application to select locations to hook the application in response to the application lacking predetermined locations to hook;

hooking the application at the selected locations by modifying routine entry points so as to additionally execute communications analysis code;

receiving a user request, the user request comprising an Internet Protocol (IP) port number and an IP address of a client system or a server system;

responsive to the received user request corresponding to a hooked location, executing the corresponding communications analysis code, the actions of the code comprising:

retaining a current set of state data of the application, where the state data if not retained would otherwise be modified by the communications analysis code;

making a communications call on behalf of the application, wherein the communications call is transparent to the application; and storing in a file a set of information communicated in response to making the call.

18. The computer readable storage medium of claim 17, wherein the communications are message queuing application communications and a program request handler program located in an Extended Common Storage Area (ECSA) is hooked.

19. The storage medium of claim 17, wherein the step of hooking the application comprises executing an alternate routine in place of a routine that is normally executed when the communications call is made by the application.

20. The storage medium of claim 17, further comprising:
after making the communications call on behalf of the application, determining a completion of the communications call; and
returning information to provide a revised state of the application that reflects the completion of the communications call.

21. The storage medium of claim 17, further comprising:
determining a termination of communications monitoring prior to a completion of the communications call; and
providing a revised state of the application notwithstanding the termination of communications monitoring.

22. The storage medium of claim 17, wherein selected location is where the application utilizes a TCP/IP protocol and the call is a TCP/IP socket call.

23. The storage medium of claim 19, wherein the selected location is where the application utilizes a TCP/IP protocol and the communications call is a TCP/IP socket call.

24. The storage medium of claim 23, wherein the set of information includes at least one of (a) data sent by the application and (b) data received by the application with the TCP/IP socket call.

25. The storage medium of claim 23, wherein the set of information includes an IP address for a partner in a communication corresponding to the TCP/IP socket call.

26. The storage medium of claim 17, wherein the call is a secure socket call.

27. The storage medium of claim 26, wherein the set of information includes data sent through a secure socket, and the data is in unencrypted from.

28. The storage medium of claim 26, wherein the set of information includes data received through a secure socket, and the data is in unencrypted form.

29. The storage medium of claim 17, wherein a stub retains the current state, determines a termination of communications monitoring prior to a completion of the call, and provides a revised state of the application notwithstanding the termination of communications monitoring.

30. An apparatus for analyzing communications made by a mainframe application operating at a node on a computer network, the apparatus comprising:

a call reception module, configured to receive a user request, the user request comprising an Internet Protocol (IP) port number and an IP address of a client system or a server system;

a call identification module, configured to identify responsive to a communications analysis module beginning execution a plurality of routines corresponding to socket calls within the application to select locations to hook the application in response to the application lacking predetermined locations to hook and configured to hook the application at the selected locations by modifying routine entry points so as to additionally execute communications analysis code;

an access control module, in communication with the call identification module, configured to retain a current set of state data of the application and make a communications call on behalf of the application, wherein the communications call is transparent to the application, and wherein the state data if not retained would otherwise be modified by the communications analysis code; and an information recording module, in communication with the access control module, configured to store in a file a set of information communicated in response to making the call.

31. The apparatus of claim 30, wherein the communications are message queuing application communications and a program request handler program located in an Extended Common Storage Area (ECSA) is hooked.

32. The apparatus of claim 30, wherein the call identification module is configured to execute an alternate routine in place of a routine that is normally executed when the communications call is made by the application.

33. The apparatus of claim 30, wherein the access control module is configured to determine a completion of the communications call after making the communications call on behalf of the application, and returns information to provide a revised state of the application that reflects the completion of the communications call.

34. The apparatus of claim 30, wherein the access control module is configured to determine a termination of communications monitoring prior to a completion of the communications call, and provides a revised state of the application notwithstanding the termination of communications monitoring.

35. The apparatus of claim 30, wherein the selected location is where the application utilizes a TCP/IP protocol and the call is a TCP/IP socket call.

36. The apparatus of claim 32, wherein the selected location is where the application utilizes a TCP/IP protocol and the communications call is a TCP/IP socket call.

37. The apparatus of claim 36, wherein the set of information includes at least one of (a) data sent by the application and (b) data received by the application with the TCP/IP socket call.

38. The apparatus of claim 36, wherein the set of information includes an IP address for a partner in a communication corresponding to the TCP/IP socket call.

39. The apparatus of claim 30, wherein the communications call is a secure socket call.

40. The apparatus of claim 39, wherein the set of information includes data sent through a secure socket, and the data is in unencrypted form.

41. The apparatus of claim 39, wherein the set of information includes data received through a secure socket, and the data is in unencrypted form.

42. The apparatus of claim 30, wherein a stub retains the current state, determines a termination of communications monitoring prior to a completion of the call, and provides a revised state of the application notwithstanding the termination of communications monitoring.

43. An apparatus for analyzing communications made by a mainframe application operating at a node on a computer network, the apparatus comprising:

means for identifying, responsive to a communications analysis module beginning execution, a plurality of routines corresponding to socket calls within the application to select locations to hook the application in response to the application lacking predetermined locations to hook;

means for hooking the application at the selected locations by modifying routine entry points so as to additionally execute communications analysis code;

means for receiving a user request, the user request comprising an Internet Protocol (IP) port number and an IP address of a client system or a server system;

means for, responsive to the received user request corresponding to a hooked location, executing the corresponding communications analysis code, the actions of the code comprising:

retaining a current set of state data of the application, wherein the state data if not retained would otherwise be modified by the communications analysis code, and making a communications call on behalf of the application, wherein the communications call is transparent to the application; and means for-storing in a file a set of information communicated in response to making the call.

44. The apparatus of claim 43, wherein the communications are message queuing application communications and a program request handler program located in an Extended Common Storage Area (ECSA) is hooked.

45. The apparatus of claim 43, wherein the application is hooked by executing an alternate routine in place of a routine that is normally executed when the communications call is made by the application.

46. The apparatus of claim 43, further comprising:

means for determining a completion of the communications call after making the communications call on behalf of the application, and returning information to provide a revised state of the application that reflects the completion of the communications call.

47. The apparatus of claim 43, further comprising:

means for determining a termination of communications monitoring prior to a completion of the communications call, and providing a revised state of the application notwithstanding the termination of communications monitoring.

48. The apparatus of claim 43, wherein the selected location is where the application utilizes a TCP/IP protocol and the call is a TCP/IP socket call.

49. The apparatus of claim 45, wherein the selected location is where the application utilizes a TCP/IP protocol and the communications call is a TCP/IP socket call.

50. The apparatus of claim 49, wherein the set of information includes at least one of (a) data sent by the application and (b) data received by the application with the TCP/IP socket call.

51. The apparatus of claim 49, wherein the set of information includes an IP address for a partner in a communication corresponding to the TCP/IP socket call.

52. The apparatus of claim 43, wherein the communications call is a secure socket call.

53. The apparatus of claim 52, wherein the set of information includes data sent through a secure socket, and the data is in unencrypted form.

54. The apparatus of claim 52, wherein the set of information includes data received through a secure socket, and the data is in unencrypted form.

55. The apparatus of claim 43, wherein a stub retains the current state, determines a termination of communications monitoring prior to a completion of the call, and provides a revised state of the application notwithstanding the termination of communications monitoring.

* * * * *